United States Patent
Chiang et al.

(10) Patent No.: US 7,620,261 B2
(45) Date of Patent: Nov. 17, 2009

(54) EDGE ADAPTIVE FILTERING SYSTEM FOR REDUCING ARTIFACTS AND METHOD

(75) Inventors: Patricia Chiang, Singapore (SG); Lucas Y. W. Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 861 days.

(21) Appl. No.: 10/995,937

(22) Filed: Nov. 23, 2004

(65) Prior Publication Data

US 2006/0110062 A1 May 25, 2006

(51) Int. Cl.
*G06K 9/40* (2006.01)
*G06K 9/36* (2006.01)

(52) U.S. Cl. ...................... 382/260; 382/232

(58) Field of Classification Search ............. 382/260, 382/261, 232, 233, 266, 268, 269
See application file for complete search history.

(56) References Cited

U.S. PATENT DOCUMENTS

| | | | |
|---|---|---|---|
| 5,802,218 A | | 9/1998 | Brailean |
| 5,974,197 A | * | 10/1999 | Lee et al. .................... 382/268 |
| 6,226,050 B1 | * | 5/2001 | Lee ............................ 348/607 |
| 6,240,135 B1 | | 5/2001 | Kim |
| 6,631,162 B1 | | 10/2003 | Lee et al. |
| 6,944,224 B2 | * | 9/2005 | Zhao et al. .............. 375/240.16 |

| | | |
|---|---|---|
| 2004/0062310 A1 | 4/2004 | Xue et al. |

FOREIGN PATENT DOCUMENTS

| | | |
|---|---|---|
| EP | 0 599 529 A2 | 6/1994 |
| EP | 0 817 497 A3 | 1/1998 |
| EP | 1 146 748 A2 | 10/2001 |
| EP | 1 209 624 A1 | 5/2002 |

OTHER PUBLICATIONS

David C. C. Wang et al., "Gradient Inverse Weighted Smoothing Scheme and the Evaluation of Its Performance", Computer Graphics and Image Processing, vol. 15, No. 2, Feb. 1981, pp. 167-181.
Y. L. Lee et al., "Blocking Effect Reduction of JPEG Images by Signal Adaptive Filtering", IEEE Transactions on Image Processing, vol. 7, No. 2, Feb. 1998, pp. 229-234.
Hyun Wook Park et al., "A Postprocessing Method for Reducing Quantization Effects in Low Bit-Rate Moving Picture Coding", IEEE Transactions on Circuits and Systems for Video Technology, vol. 9, No. 1, Feb. 1999, pp. 161-171.
"Preprocessing and Postprocessing", ISO/IEC, 1999, pp. 284-293.

* cited by examiner

*Primary Examiner*—Yon Couso
(74) *Attorney, Agent, or Firm*—Lisa K. Jorgenson; William A. Munck

(57) ABSTRACT

A method includes receiving image information representing at least one image. The image information defines multiple pixels in the at least one image. The method also includes identifying filter weights associated with the pixels. The filter weights are based on edge contents of at least a portion of the at least one image. In addition, the method includes filtering the image information using the identified filter weights.

27 Claims, 5 Drawing Sheets

*FIG. 5*
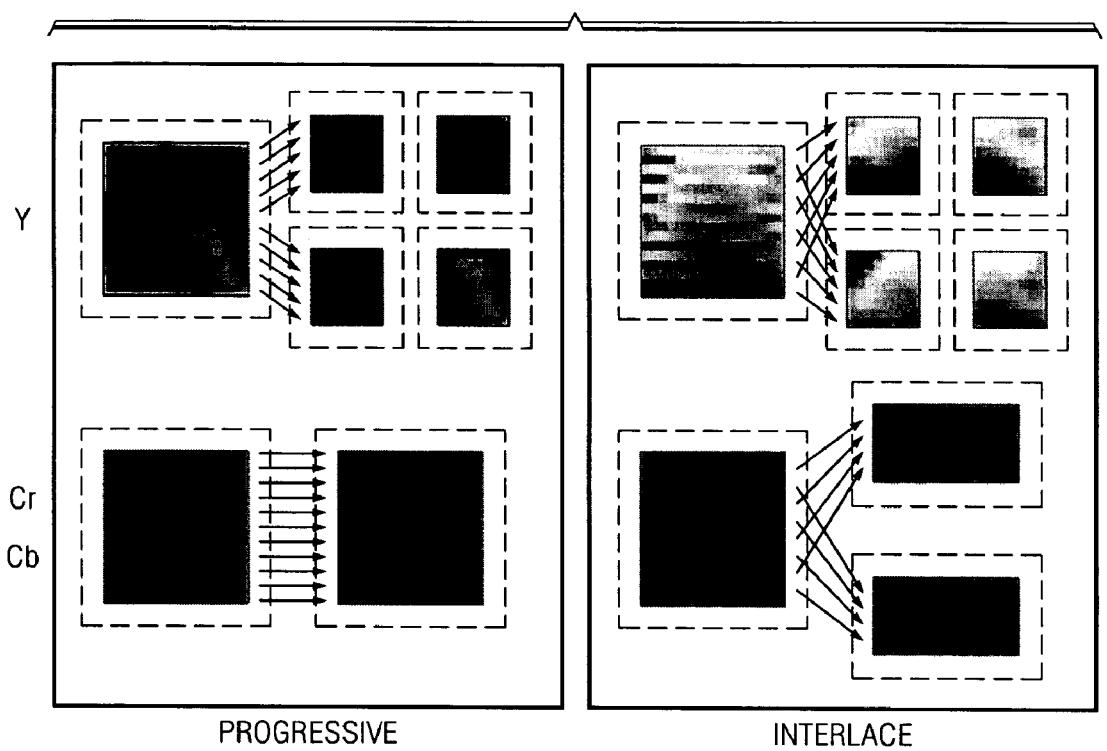
PROGRESSIVE                    INTERLACE
*FIG. 6*
| -1 | 0 | 1 |
|----|---|---|
| -2 | 0 | 2 |
| -1 | 0 | 1 |
HORIZONTAL MASK
| -1 | -2 | -1 |
|----|----|----|
| 0  | 0  | 0  |
| 1  | 2  | 1  |
VERTICAL MASK
*FIG. 7*
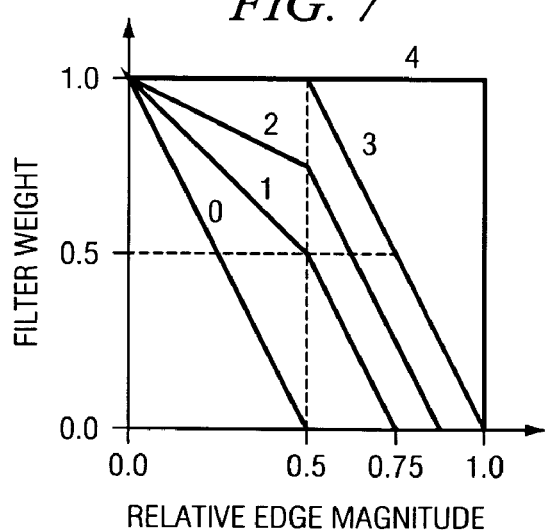

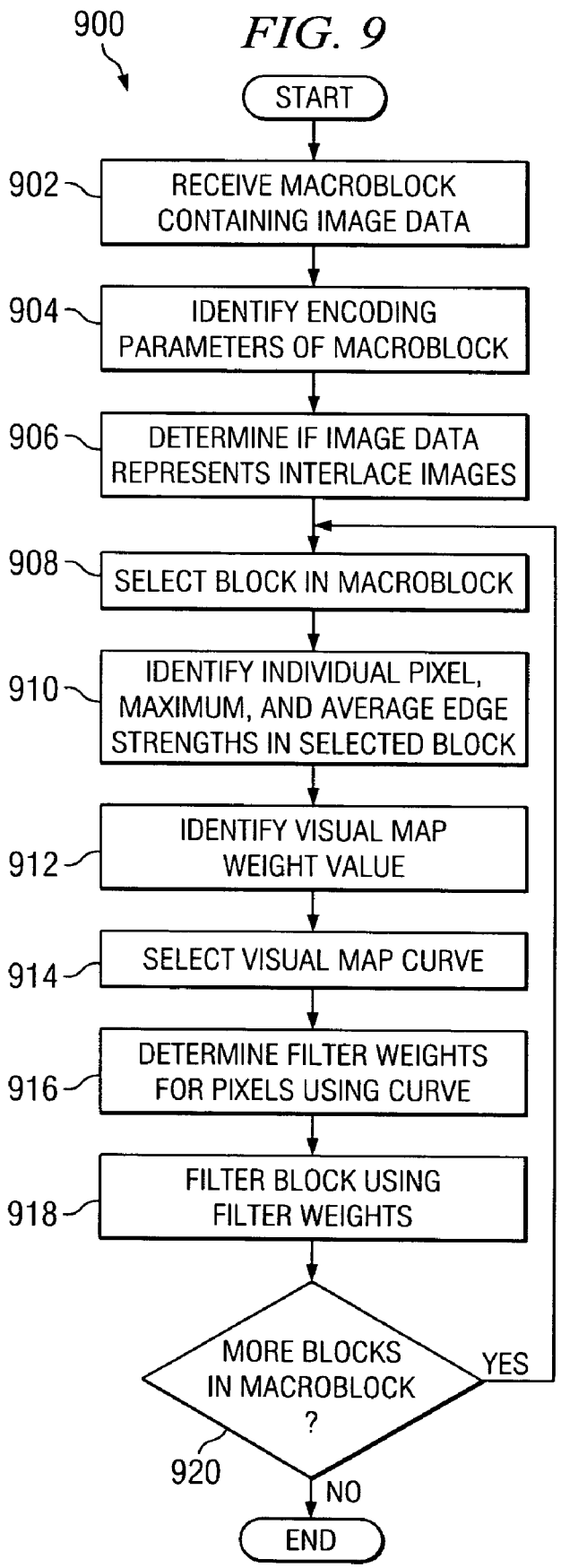

EDGE ADAPTIVE FILTERING SYSTEM FOR REDUCING ARTIFACTS AND METHOD

TECHNICAL FIELD

This disclosure is generally directed to image processing systems and more specifically to an edge adaptive filtering system for reducing artifacts and method.

BACKGROUND

Many different compression or encoding schemes are available for compressing or encoding digital video images and other digital images. For example, the Moving Picture Experts Group ("MPEG") encoding standards, including MPEG-1, MPEG-2, and MPEG-4, are routinely used to encode video images. As another example, the Joint Photographic Experts Group ("JPEG") encoding standards are routinely used to encode still images. Typical encoding standards compress images by dividing an image into multiple blocks and then encoding each of the blocks separately.

Compressing video or other image data often results in a loss of information. For example, encoding schemes often use transform coefficients, such as discrete cosine transform ("DCT") coefficients, to represent an image. Typical encoding schemes divide the transform coefficients by a quantization parameter, which often truncates higher frequency transform coefficients more than lower frequency coefficients. Also, typical encoding schemes have difficulty compressing video images when the video images contain a scene that is fading in or fading out or when two scenes are cross-fading (one scene is fading in while another scene is fading out).

These and other problems often cause noticeable flaws or distortions in images displayed after decoding. As an example, distortions around sharp edges in an image (referred to as "ringing artifacts") and distortions along the borders of the blocks (referred to as "blocking artifacts") may be created.

SUMMARY

This disclosure provides an edge adaptive filtering system for reducing artifacts and method.

In a first embodiment, a method includes receiving image information representing at least one image. The image information defines multiple pixels in the at least one image. The method also includes identifying filter weights associated with the pixels. The filter weights are based on edge contents of at least a portion of the at least one image. In addition, the method includes filtering the image information using the identified filter weights.

In a second embodiment, an image decoder includes a decoder capable of receiving encoded image information representing at least one image and decoding the encoded image information to produce decoded image information. The decoded image information defines multiple pixels in the at least one image. The image decoder also includes an adaptive edge filter capable of filtering the decoded image information using filter weights associated with the pixels. The filter weights are based on edge contents of at least a portion of the at least one image.

In a third embodiment, an adaptive edge filter includes a block selector capable of receiving a macroblock that defines pixels of an image, dividing the macroblock into multiple blocks, and selecting one of the blocks. The adaptive edge filter also includes an edge analyzer capable of generating multiple edge strengths based on edge contents of the selected block. The adaptive edge filter further includes a weight generator capable of identifying filter weights for the pixels in the selected block. The filter weights are based on the edge strengths associated with the selected block. In addition, the adaptive edge filter includes a filter capable of filtering the selected block using the filter weights associated with the pixels in the selected block.

In a fourth embodiment, an apparatus includes an interface capable of receiving encoded image information representing at least one image. The apparatus also includes an image decoder capable of decoding the encoded image information to produce decoded image information. The decoded image information defines multiple pixels in the at least one image. The image decoder is also capable of filtering the decoded image information using filter weights associated with the pixels. The filter weights are based on edge contents of at least a portion of the at least one image.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIG. 5 illustrates an example operation of a block selector in an adaptive edge filter according to one embodiment of this disclosure;

FIG. 6 illustrates sobel masks for use by an edge analyzer in an adaptive edge filter according to one embodiment of this disclosure;

FIG. 7 illustrates example visual weight curves for use by a visual weight map generator in an adaptive edge filter according to one embodiment of this disclosure;

FIG. 9 illustrates an example method for edge adaptive filtering according to one embodiment of this disclosure.

DETAILED DESCRIPTION

Figure 1:
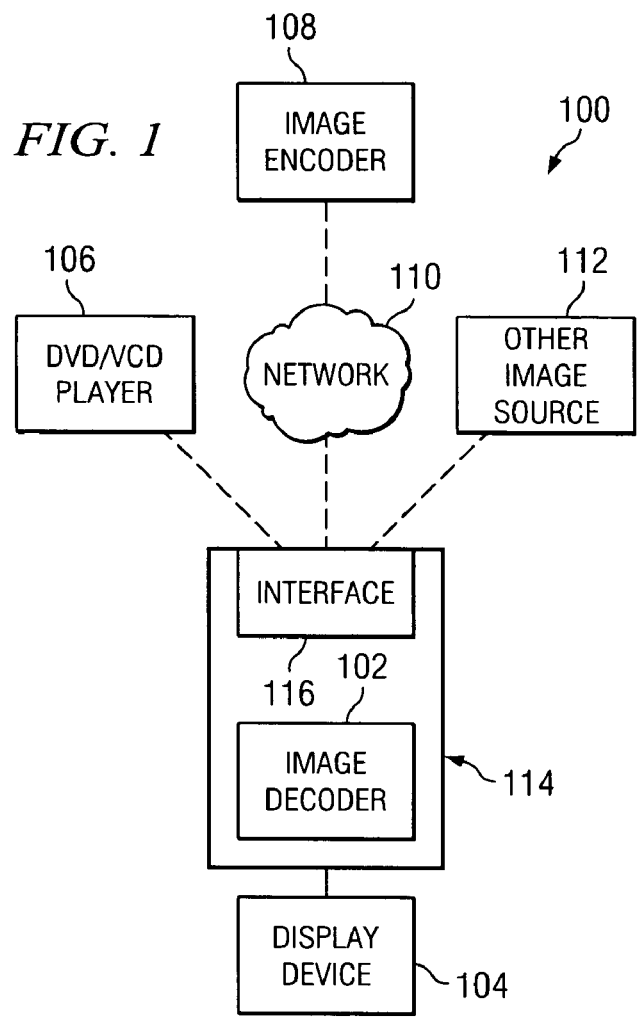
FIG. 1 illustrates an example image processing system according to one embodiment of this disclosure.

FIG. 1 illustrates an example image processing system 100 according to one embodiment of this disclosure. The embodiment of the image processing system 100 shown in FIG. 1 is for illustration only. Other embodiments of the image processing system 100 may be used without departing from the scope of this disclosure.

Figure 2:
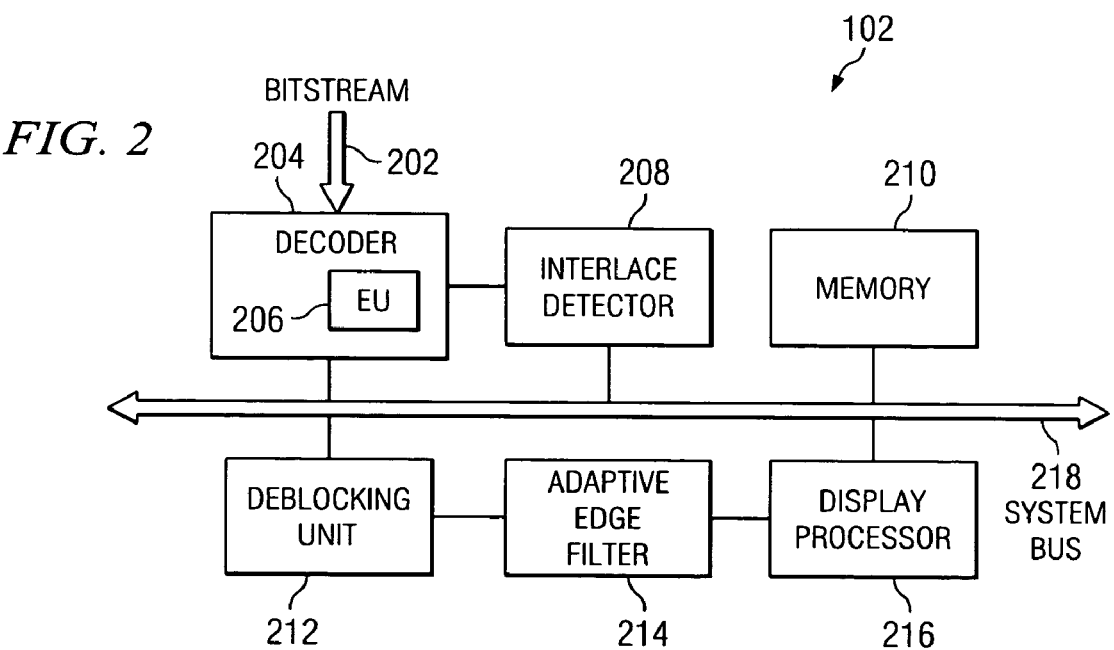
FIG. 2 illustrates an example image decoder according to one embodiment of this disclosure.

As shown in FIG. 1, the image processing system 100 includes an image decoder 102. The image decoder 102 receives and decodes encoded image information. For example, the image decoder 102 could receive and decode video image information encoded using a Moving Picture Experts Group ("MPEG") encoding standard, such as MPEG-1, MPEG-2, or MPEG-4. As another example, the image decoder 102 could receive and decode still image information encoded using a Joint Photographic Experts Group ("JPEG") encoding standard. The image decoder 102 includes any hardware, software, firmware, or combination thereof for decoding encoded image information. An example embodiment of the image decoder 102 is shown in FIG. 2, which is described below.

A display device 104 is coupled to the image decoder 102. In this document, the term "couple" and its derivatives refer to any direct or indirect communication between two or more elements, whether or not those elements are in physical contact with one another. The display device 104 presents one or more images that are decoded and provided by the image decoder 102. For example, the display device 104 could display a series of images forming a decoded video sequence. As another example, the display device 104 could display decoded still photographs or other non-video images. The display device 104 could also present other information, such as audio information accompanying a video sequence. The display device 104 includes any hardware, software, firmware, or combination thereof for presenting decoded images to viewers, such as a television or a computer display.

The encoded image information received by the image decoder 102 could originate from one or multiple sources. In the illustrated example, the image decoder 102 could receive encoded image information from a digital video disk ("DVD")/video compact disc ("VCD") player 106. The DVD/VCD player 106 provides encoded video information and other information to the image decoder 102, such as video information associated with a movie. The image information from the DVD/VCD player 106 could be encoded using any suitable encoding standard. The DVD/VCD player 106 represents any suitable device capable of reading encoded video information from a DVD or VCD disc.

As another example, the image decoder 102 could receive encoded image information from an image encoder 108 over a network 110. The image encoder 108 could provide any encoded image information to the image decoder 102. For example, the image encoder 108 could represent a video server capable of encoding and streaming a video bitstream to the image decoder 102 over the network 110. The image encoder 108 could also represent a device capable of providing encoded still images or other non-video images to the image decoder 102. The image encoder 108 includes any hardware, software, firmware, or combination thereof for encoding image information. Also, the network 110 represents any suitable wireline network, wireless network, or combination of networks capable of transporting information between the image encoder 108 and the image decoder 102. As a particular example, the image encoder 108 could represent a device that encodes video information for transmission over a satellite, cable, or other television network 110.

As yet another example, the image decoder 102 could receive encoded image information from any other image source 112. The other image sources 112 could represent any other suitable source(s) of image information. For example, the other image sources 112 could represent digital cameras, digital camcorders, satellite television receivers, cable television receivers, or broadcast or other television receivers.

As shown in FIG. 1, the image decoder 102 could form part of an apparatus 114 that includes an interface (I/F) 116. The interface 116 represents an interface that allows the image decoder 102 to receive image information from one or more of the image sources. For example, the interface 116 could represent a connector that allows the image decoder 102 to be coupled to the DVD/VCD player 106 or other image source 112 using a video cable or other cable. The interface 116 could also represent a tuner that receives television or other broadcast signals. As particular examples, the image decoder 102 could reside within an apparatus 116 such as a cable set-top box, satellite receiver, or other television receiver.

In some embodiments, images represented by the encoded information received at the image decoder 102 are encoded by dividing the images into blocks. Conventional image decoders often create distortions or "artifacts" in a decoded image. For example, distortions around sharp edges in an image are referred to as "ringing artifacts." These distortions take many forms, including ringing noise, mosquito noise, sinusoids, and texture noise. As another example, distortions along the borders of the blocks are referred to as "blocking artifacts."

In one aspect of operation, the image decoder 102 decodes the received information representing an image. The image decoder 102 then uses an auto-regressive edge adaptive filtering system to filter the image and at least partially reduce ringing artifacts in the image. The image decoder 102 may also use a de-blocking filtering system to filter the image and at least partially reduce blocking artifacts in the image.

In particular embodiments, the edge adaptive filtering system identifies a relative edge magnitude representing the distance between a pixel of interest and an edge in an image. For each pixel, the edge adaptive filtering system uses the relative edge magnitude for that pixel to identify a filter weight for that pixel. The filter weights for the pixels are then used by the edge adaptive filtering system to filter the image and reduce or eliminate ringing artifacts in the image. In this way, the filter weights identified by the edge adaptive filtering system are based on the edge contents in the image. The filter weights may be adjusted dynamically to improve the visual quality of an image. This may allow the image decoder 102 to more effectively remove distortions from an image being decoded. In this document, the term "each" refers to every of at least a subset of the identified items. Also, the phrase "edge contents" refers to any edges contained in all or a portion of an image being processed, even if an image does not contain any edges.

In another aspect of operation, the image decoder 102 uses an interlace detector to detect whether an image being decoded is an interlaced image or a progressive image. If the image is interlaced, the image decoder 102 adjusts the edge adaptive filtering system so that interlaced details of the image are protected and filtering is improved or optimized. In this way, the image decoder 102 may more effectively remove artifacts in various types of images.

Although FIG. 1 illustrates one example of an image processing system 100, various changes may be made to FIG. 1. For example, FIG. 1 illustrates one example environment in which the image decoder 102 may operate. The image decoder 102 could be used in any other environments or systems. Also, the functional division of FIG. 1 is for illustration only. Various components in FIG. 1 may be combined or omitted and additional components could be added according to particular needs. As examples, the image decoder 102 could be integrated into the display device 104, the DVD/VCD player 106, or another image source 112 such as a satellite, cable, broadcast, or other television receiver.

FIG. 2 illustrates an example image decoder 102 according to one embodiment of this disclosure. The embodiment of the image decoder 102 is for illustration only. Other embodiments of the image decoder 102 may be used without departing from the scope of this disclosure. Also, for ease of explanation, the image decoder 102 is described as operating in the system 100 of FIG. 1. The image decoder 102 could be used in any other system.

The image decoder 102 implements an edge adaptive filtering system that reduces or removes ringing artifacts in decoded images. The edge adaptive filtering system may be used in conjunction with a de-blocking filtering system that reduces or removes blocking artifacts in decoded images. The edge adaptive filtering system may be used at any suitable point during processing of images by the image decoder 102. For example, the edge adaptive filtering system could operate after motion compensation during image decoding, after in-loop filtering of decoded images, or before the scaling and processing of the decoded images for display.

In the illustrated example, the image decoder 102 receives a digital bitstream 202. The bitstream 202 represents a stream of video image information, still image information, or other image information. The bitstream 202 could, for example, be received from a tuner 114 or other source of image information.

The bitstream 202 is provided to a decoder 204. The decoder 204 decodes one or more images represented by information in the bitstream 202. For example, the decoder 204 could implement MPEG decoding, such as MPEG-1, MPEG-2, or MPEG-4 decoding, to decode video images. The decoder 204 could also implement International Telecommunications Union—Telecommunication ("ITU-T") H.263 or H.264 video decoding. The decoder 204 could further implement Windows Media Video ("WMV") or Society of Motion Picture and Television Engineers ("SMPTE") VC9 video decoding. In addition, the decoder 204 could implement JPEG decoding to decode still images. The decoder 204 includes any hardware, software, firmware, or combination thereof for decoding image information.

In this example, the decoder 204 includes an extraction unit ("EU") 206. The extraction unit 206 extracts various encoding parameters from the bitstream 202. The extracted parameters represent information used by the decoder 204 to decode the bitstream 202. For example, the extraction unit 206 could extract quantization parameters, quantization matrices, a macroblock coding type, a transform type, a block size, and a picture type from the bitstream 202. These parameters are used by the decoder 204 to decode image information in the bitstream 202. The extraction unit 206 includes any hardware, software, firmware, or combination thereof for extracting encoding parameters.

The decoded image information generated by the decoder 204 is provided to an interlace detector 208. The interlace detector 208 determines whether the decoded image information represents interlaced images. If the interlace detector 208 determines that the image information represents interlaced images, the interlace detector 208 signals that the images are interlaced. This may include, for example, the interlace detector 208 setting a flag to indicate that the decoded images are interlaced. The interlace detector 208 may use any technique to identify interlaced images. The interlace detector 208 includes any hardware, software, firmware, or combination thereof for detecting interlaced images. In other embodiments, the interlace detector 208 may be omitted from the image decoder 102.

The decoded image information from the decoder 204, the parameters from the extraction unit 206, and the interlace information (such as the flag) from the interlace detector 208 are stored in a memory 210. For example, in some embodiments, decoded image information is stored as pixel arrays in the memory 210. The memory 210 represents any memory or memories capable of storing and facilitating retrieval of information. As examples, the memory 210 could represent a random access memory, hard disk drive, or other volatile and/or non-volatile memory or memories. In particular embodiments, image information may be fetched from and stored in the memory 210 in blocks rather than as raster lines, which may result in less memory being needed for resizing images and handling edge filtering at block boundaries.

The image information stored in the memory 210 may be retrieved and processed by a de-blocking unit 212. The de-blocking unit 212 processes image information to reduce or remove blocking artifacts from decoded images. For example, the de-blocking unit 212 may perform de-blocking filtering to reduce or remove grid and staircase noise along borders of blocks in a decoded image. The de-blocking unit 212 includes any hardware, software, firmware, or combination thereof for at least partially reducing blocking artifacts in one or more images. In other embodiments, the decoder 204 may implement in-loop filtering to reduce or eliminate blocking artifacts, and the de-blocking unit 212 may be omitted from the image decoder 102.

Figure 3:
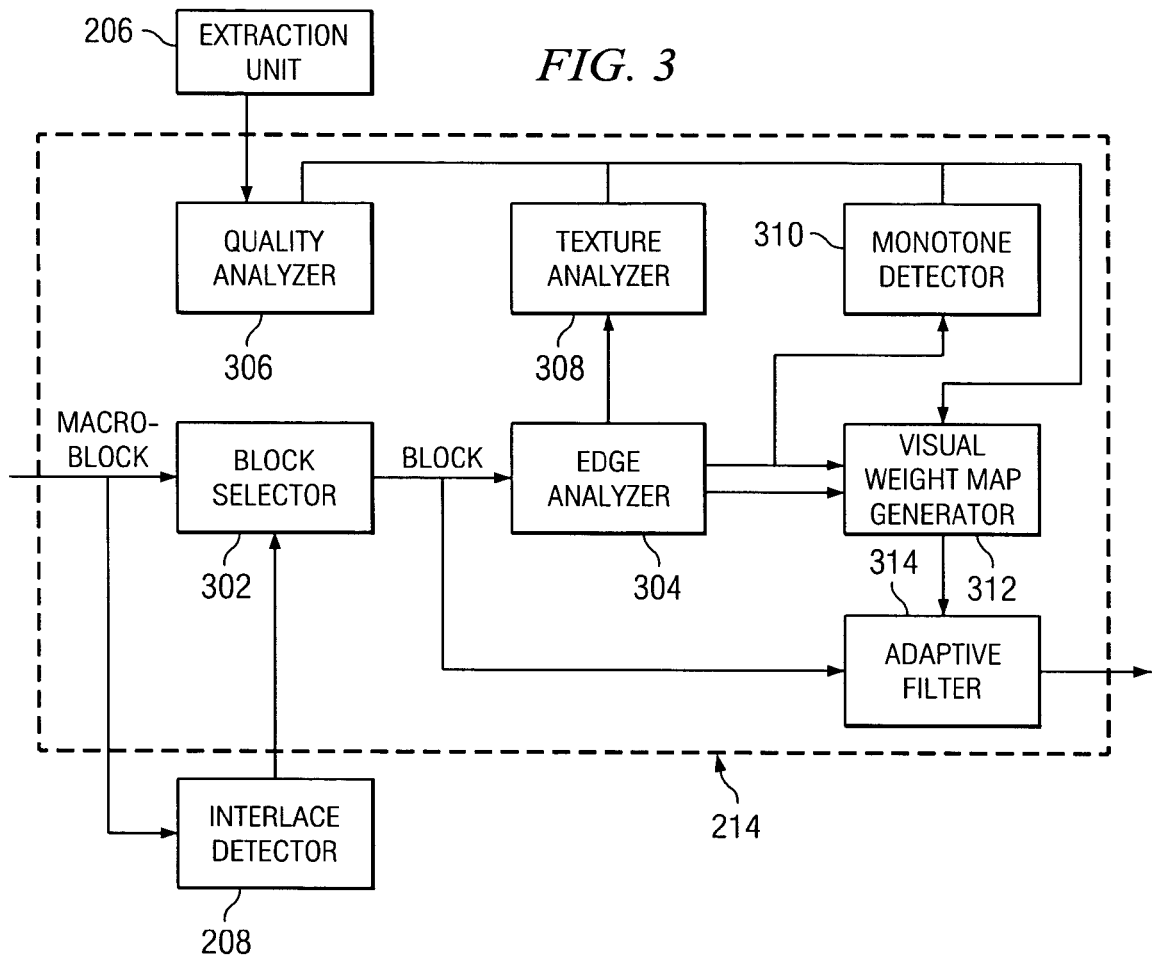
FIG. 3 illustrates an example adaptive edge filter in an image decoder according to one embodiment of this disclosure.

The output of the de-blocking unit 212 is provided to an adaptive edge filter 214. The adaptive edge filter 214 processes image information to remove ringing artifacts from decoded images. For example, the adaptive edge filter 214 may perform edge adaptive filtering to reduce or remove ringing artifacts near edges and in flat regions of decoded images. The adaptive edge filter 214 includes any hardware, software, firmware, or combination thereof for at least partially reducing ringing artifacts in one or more images. An example embodiment of the adaptive edge filter 214 is shown in FIG. 3, which is described below.

While FIG. 2 illustrates the adaptive edge filter 214 processing image information after the de-blocking unit 212, the adaptive edge filter 214 could be used in any other suitable locations in the image decoder 102. For example, the adaptive edge filter 214 could operate after the image information is decoded by the decoder 204 and before the image information is processed by the de-blocking unit 212.

The filtered image information from the adaptive edge filter 214 is provided to a display processor 216. The display processor 216 processes the image information for presentation on the display device 104. For example, the display processor 216 could perform de-interlacing, scaling, cropping, image enhancement, brightness and contrast control, and color space conversion operations. The processed image information may then be provided for storage in the memory 210 for retrieval and display by the display device 104. The display processor 216 includes any suitable processor or controller for processing image information for presentation.

The various components in the image decoder 102 communicate over a system bus 218. The system bus 218 represents any suitable bus capable of transporting information between components of the image decoder 102. The system bus 218 may also have any suitable size, such as a 32-bit or 64-bit bus.

In one aspect of operation, the adaptive edge filter 214 acts as an auto-regressive edge adaptive filtering system to filter images and at least partially reduce ringing artifacts in the images. In some embodiments, the adaptive edge filter 214 applies an edge "operator" or function to identify an edge magnitude for each pixel in a block of the image. The edge magnitude identifies a likelihood that the pixel lies along an edge in the image block. The adaptive edge filter 214 also determines average and maximum edge magnitudes for that image block. The adaptive edge filter 214 then calculates a relative edge magnitude for each pixel in the block. Using the relative edge magnitudes for the pixels, the adaptive edge filter 214 identifies a filter weight for each pixel in the block.

Using the filter weights, the adaptive edge filter 214 filters the image block to reduce or remove ringing artifacts in the image.

In another aspect of operation, the interlace detector 208 determines whether images being decoded are interlaced images or progressive images. If the images are interlaced, the interlace detector 208 sets a flag to indicate that the images are interlaced. The adaptive edge filter 214 uses the interlace flag to protect the interlaced details of the images during filtering.

Although FIG. 2 illustrates one example of an image decoder 102, various changes may be made to FIG. 2. For example, the functional division of the image decoder 102 shown in FIG. 2 is for illustration only. Various components in FIG. 2 may be combined or omitted and additional components could be added according to particular needs.

FIG. 3 illustrates an example adaptive edge filter 214 in an image decoder according to one embodiment of this disclosure. The embodiment of the adaptive edge filter 214 is for illustration only. Other embodiments of the adaptive edge filter 214 may be used without departing from the scope of this disclosure. Also, for ease of explanation, the adaptive edge filter 214 is described as residing within the image decoder 102 of FIG. 2 operating in the system 100 of FIG. 1. The adaptive edge filter 214 could be used in any other device and in any other system.

As shown in FIG. 3, the adaptive edge filter 214 receives encoding parameters from the extraction unit 206 in the decoder 204. The encoding parameters could include quantization parameters, macroblock coding type, and picture type. The adaptive edge filter 214 also receives information from the interlace detector 208, such as a flag indicating whether images being processed are interlaced. In addition, the adaptive edge filter 214 receives a macroblock of image data from the decoder 204. The information received by the adaptive edge filter 214 may be received directly from the decoder 204, extraction unit 206, and interlace detector 208. The information received by the adaptive edge filter 214 could also be received indirectly from the decoder 204, extraction unit 206, and interlace detector 208 through the memory 210.

In the illustrated example, a block selector 302 receives a macroblock from the decoder 204 and an interlace flag from the interlace detector 208. The block selector 302 then selects a block of image information from the macroblock and provides the selected block for further processing by the adaptive edge filter 214. For example, the block selector 302 may partition the macroblock into luminance and chrominance blocks and then select and output each block for further processing. The partitioning of the macroblock into luminance and chrominance blocks may be based on the interlace flag from the interlace detector 208. In other words, the block selector 302 could partition macroblocks representing interlaced images in one way and macroblocks representing progressive images in another way. The block selector 302 includes any hardware, software, firmware, or combination thereof for selecting and outputting blocks from a macroblock.

The block of image information selected by the block selector 302 is provided to an edge analyzer 304. The edge analyzer 304 analyzes the selected block to identify various characteristics associated with any edges contained in the block. For example, the edge analyzer 304 may identify an individual pixel edge strength $edge_{x,y}$ for each pixel in the block, where (x,y) represents the location of a pixel. The individual pixel edge strength identifies the likelihood that a pixel forms part of an edge in the image. The edge analyzer 304 may also identify a maximum edge strength $edge_{max}$ and an average edge strength $edge_{avg}$ for the selected block. The maximum edge strength identifies the highest likelihood that any pixel in the block forms part of an edge. The average edge strength identifies the average likelihood that a pixel in the block forms part of an edge. The edge analyzer 304 includes any hardware, software, firmware, or combination thereof for analyzing a block of image data to generate information about any edges in the block.

A quality analyzer 306 receives the encoding parameters extracted by the extraction unit 206 in the decoder 204. Using the encoding parameters, the quality analyzer 306 identifies the image quality associated with the macroblock being processed. The quality analyzer 306 then outputs a visual weight curve value. As explained below, the visual weight curve value is used by the adaptive edge filter 214 to filter the macroblock. The quality analyzer 306 includes any hardware, software, firmware, or combination thereof for identifying the quality of image information being filtered.

A texture analyzer 308 receives the average edge strength $edge_{avg}$ from the edge analyzer 304. The texture analyzer 308 determines the texture contents of the selected block being processed using the average edge strength. For example, the texture analyzer 308 may compare the average edge strength to a threshold. The texture analyzer 308 then outputs another visual weight curve value. The texture analyzer 308 includes any hardware, software, firmware, or combination thereof for identifying the texture contents of image information being processed.

A monotone detector 310 receives the maximum edge strength $edge_{max}$ from the edge analyzer 304. The monotone detector 310 detects monotone or near monotone image information using the maximum edge strength. For example, the monotone detector 310 may compare the maximum edge strength to a threshold. The monotone detector 310 then outputs yet another visual weight curve value. The monotone detector 310 includes any hardware, software, firmware, or combination thereof for identifying monotone or near monotone image information.

The visual weight curve values output by the quality analyzer 306, texture analyzer 308, and monotone detector 310 are used to identify a visual weight curve. The visual weight curve is used by a visual weight map generator 312 to associate filter weights with pixels in the selected image block. For example, the visual weight map generator 312 receives the individual pixel edge strengths $edge_{x,y}$ and the maximum edge strength $edge_{max}$ from the edge analyzer 304. For each pixel in a selected block, the visual weight map generator 312 identifies a filter weight $wgt_{x,y}$ for a pixel at position (x,y) using the individual pixel edge strengths, the maximum edge strength, and the visual weight curve. The filter weights are then output by the visual weight map generator 312. The visual weight map generator 312 includes any hardware, software, firmware, or combination thereof for identifying filter weights used to filter image information.

An adaptive filter 314 receives the selected block of image information from the block selector 302. The adaptive filter 314 also receives the filter weights from the visual weight map generator 312. The adaptive filter 314 uses the identified filter weights to adaptively filter the image information in the selected block. The adaptive filter 314 then outputs filtered image information, which may represent an image with reduced or eliminated ringing artifacts. The adaptive filter 314 includes any hardware, software, firmware, or combination thereof for filtering image information. The adaptive filter 314 could, for example, represent a 3×3 filter.

The following represents an example explanation of the operation of the adaptive edge filter 214 when processing MPEG-2 encoded video information. The adaptive edge filter 214 could operate in the same or similar manner when processing any image information-encoded using any encoding scheme.

In this example, the bitstream 202 received by the image decoder 102 contains DCT coefficients, and the extraction unit 206 identifies frame or field DCT coding parameters. Macroblocks that are field coded are treated as interlaced images, and macroblocks that are frame coded are treated as progressive images. For example, if the interlace detector 208 determines that images are field coded, the interlace detector 208 could set the interlace flag to indicate that the images are interlaced.

In some embodiments, the interlace detector 208 uses statistical data to determine if images represent a sequence of interlaced images. In particular embodiments, the interlace detector 208 uses field correlation and field mean values to identify whether images are field or frame coded. For example, the interlace detector 208 could operate using the following equations:

$$\text{field\_correlation} = \frac{1}{128}\left(\sum_{j=0}^{7}\sum_{i=0}^{15} ipix_{i,j} ipix_{i,j+1} - \frac{m_0 m_1}{128}\right) \quad (1)$$

$$\text{field\_mean} = m_{\substack{n \\ n \in \{0,1\}}} = \sum_{j=0}^{7}\sum_{i=0}^{15} ipix_{i,2j+n} \quad (2)$$

$$\text{field\_mean\_difference} = |m_0 - m_1| \quad (3)$$

where $ipix_{i,j}$ represents an input pixel at position (i,j) in an image block, $m_0$ represents an even field mean, and $m_1$ represents an odd field mean.

Figure 4:
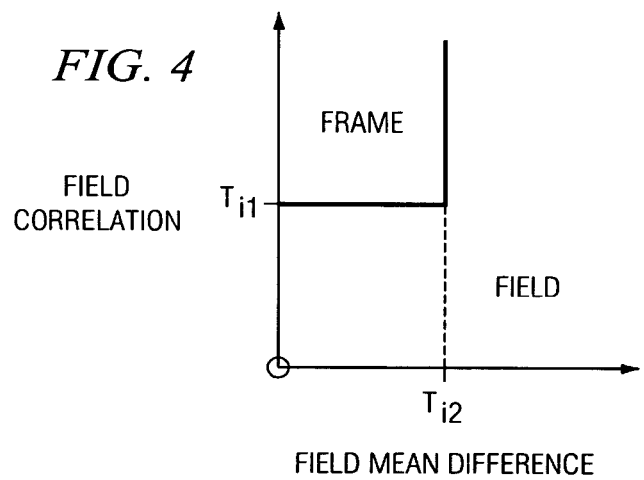
FIG. 4 illustrates an example operation of an interlace detector in an image decoder according to one embodiment of this disclosure.

The interlace detector 208 determines whether images are field or frame coded using the results from Equations (1)-(3) above. For example, as shown in FIG. 4, the interlace detector 208 could compare the field correlation value to a first threshold $T_{i1}$ and compare the field mean difference value to a second threshold $T_{i2}$. In this example, the interlace detector 208 determines that an image is frame coded (and likely not interlaced) if the field correlation value exceeds the threshold $T_{i1}$ and the field mean difference does not exceed the second threshold $T_{i2}$. Otherwise, if the field correlation value does not exceed the threshold $T_{i1}$ and/or the field mean difference exceeds the second threshold $T_{i2}$, the interlace detector 208 determines that an image is field coded (and likely interlaced). The interlace detector 208 then sets a flag indicating whether the images are interlaced, and the adaptive edge filter 214 uses the flag to process the images. The thresholds $T_{i1}$ and $T_{i2}$ could have any suitable value, such as when $T_{i1}$ equals 32 and $T_{i2}$ equals 4.

A special case may occur when a completely flat region of an image is processed. In that case, the field correlation and field mean difference values could equal or approximately equal zero. When this is detected, the interlace detector 208 could determine that the image is frame coded even though the field correlation and field mean difference values fall outside of the "Frame" region shown in FIG. 4.

In some embodiments, the block selector 302 in the adaptive edge filter 214 uses the flag from the interlace detector 208 to determine how to partition macroblocks into individual blocks for processing. For example, FIG. 5 illustrates how a macroblock may be divided into blocks based on whether the flag from the interlace detector 208 is set. In this example, the information representing an image is divided into chrominance $C_r$ data, chrominance $C_b$ data, and luminance Y data. In particular embodiments, the image information is encoded in a chrominance sampling format of 4:2:0. A macroblock is defined by a 16×16 pixel array of luminance Y data, an 8×8 pixel array of chrominance $C_r$ data, and an 8×8 pixel array of chrominance $C_b$ data.

If the flag from the interlace detector 208 indicates that images are not interlaced, the block selector 302 treats the images as being progressive. As shown in FIG. 5, the block selector 302 subdivides the 16×16 pixel array of luminance Y data into four 8×8 blocks. The block selector 302 treats the 8×8 pixel array of chrominance $C_r$ data as an undivided block and the 8×8 pixel array of chrominance $C_b$ data as an undivided block. In addition, two extra rows or columns of pixels that outline each boundary of the luminance and chrominance blocks are added, increasing the size of each luminance and chrominance block to 12×12. The blocks of luminance and chrominance data are then individually provided to the edge analyzer 304 and the adaptive filter 314 for processing.

If the flag from the interlace detector 208 indicates that the images are interlaced, the block selector 302 generates four 8×8 blocks from the luminance Y data. The data in each 8×8 block represents luminance Y data from the same line parity. Also, the block selector 302 divides the 8×8 pixel array of chrominance Cr data into two 8×4 blocks and divides the 8×8 pixel array of chrominance $C_b$ data into two 8×4 blocks. Again, the data in each 8×4 block represents data from the same line parity. In addition, two extra rows or columns of pixels that outline each boundary of the luminance and chrominance blocks are added, increasing the size of each luminance block to 12×12 and the size of each chrominance block to 12×8.

The edge analyzer 304 receives the various luminance and chrominance blocks from the block selector 302 and processes the blocks to identify information about edges in an image being processed. For example, the edge analyzer 304 could identify an individual pixel edge strength for each pixel in a received block.

In some embodiments, the edge analyzer 304 uses sobel operators to identify an edge strength for each pixel. In particular embodiments, the edge analyzer 304 operates using the following equations:

$$G_x = \sum_j m_{jx} \times P_j \quad (4)$$

$$G_y = \sum_j m_{jy} \times P_j \quad (5)$$

$$edge_{x,y} = |G_x| + |G_y| \quad (6)$$

where $G_x$ represents a horizontal gradient, $G_y$ represents a vertical gradient, $m_{jx}$ represents the horizontal sobel mask of pixel j shown in FIG. 6, $m_{jy}$ represents the vertical sobel mask of pixel j shown in FIG. 6, and $P_j$ represents the value of pixel j. In FIG. 6, each of the masks represents a 3×3 processing window, and the pixel of interest (pixel j) occupies the shaded portion of the horizontal and vertical masks.

The edge analyzer 304 uses the individual pixel edge strengths computed above to calculate two additional statistics (the average edge strength and the maximum edge strength) associated with the received block. In particular embodiments, the edge analyzer 304 operates using the following formulas:

$$edge_{avg} = \underset{x,y \in \{0,1,...,7\}}{Avg} \{edge_{x,y}\} \qquad (7)$$

$$edge_{max} = \underset{x,y \in \{0,1,...,7\}}{Max} \{edge_{x,y}\}. \qquad (8)$$

These statistics are accumulated for a pre-defined block size that follows the size of the encoded data for the image.

The extraction unit 206 in the decoder 204 extracts various encoding parameters from the MPEG-2 bitstream 202. The parameters may include the quan_scale_code, quan_scale_type, non_linear_quan_scale, quan_matrix, macroblock_type, and picture_coding_type parameters. Among other things, these parameters indicate whether the image data represents intra-coded or inter-coded data and whether the image is an I-picture, P-picture, or B-picture. Also, a dct_type parameter (field coded or frame coded) can be extracted and used to determine whether images are interlaced in place of or in addition to the output of the interlace detector 208.

The quality analyzer 306 uses the extracted parameters to adaptively output a visual weight curve value $ct_q$. The monotone detector 310 uses the visual weight curve value $ct_q$ to output a visual weight curve value $ct_m$. The texture analyzer 308 uses the visual weight curve value $ct_m$ to output a visual weight curve value $ct_t$. The visual weight curve value $ct_t$ is used by the visual weight map generator 312 to identify a visual weight curve, which is used to customize the adaptive filter 314.

The visual weight curve value $ct_q$ output by the quality analyzer 306 depends on the quality of the image being processed, and the visual quality of the image depends on the quantization step size. If image data is quantized coarsely, there may be high ringing noise due to greater loss of high frequency coefficients. If image data is quantized finely, there may be little ringing noise and better video quality. A higher visual weight curve value $ct_q$ may be associated with a higher quantization step size. The edge adaptive filter 214 can be customized with the quantization step size to select suitable visual weight curve values for balancing between filtering ringing noise and smoothing details.

In some embodiments, the quality analyzer 306 uses the parameters provided by the extraction unit 206 to calculate values for quan_scale and quan_norm, and these values are used to identify the visual weight curve value $ct_q$. The value quan_scale identifies the quantization step size for an image, and the value quan_norm identifies a normalized quantization step size. The value of quan_scale could be calculated using the formula:

$$quan\_scale = \begin{cases} quan\_scale\_code \times 2 & quan\_scale\_type = linear \\ non\_linear\_quan\_scale[quan\_scale\_code] & quan\_scale\_type = non\_linear \end{cases} \qquad (9)$$

where quan_scale_code, quan_scale_type, and non_linear_quan_scale represent parameters received from the extraction unit 206. Also, for intra-coded macroblocks, the value of quan_norm could be calculated as:

$$quan\_norm = quan\_scale \times [quan\_matrix[0][1] + quan\_matrix[1][0]]/32; \qquad (10)$$

where quan_matrix represents another parameter received from the extraction unit. For inter-coded macroblocks, the value of quan_norm could be calculated as:

$$quan\_norm = quan\_scale \times quan\_matrix[0][1]/16. \qquad (11)$$

In particular embodiments, the quality analyzer 306 uses multiple thresholds and the value of quan_norm to select a visual weight curve value $ct_q$. For example, if the value of quan_norm is less than a first threshold $T_{q0}$, the visual weight curve value $ct_q$ is set to 0. If the value of quan_norm is greater than the first threshold $T_{q0}$ and less than a second threshold $T_{q1}$, the visual weight curve value $ct_q$ is set to 1. If the value of quan_norm is greater than the second threshold $T_{q1}$ and less than a third threshold $T_{q2}$, the visual weight curve value $ct_q$ is set to 2. Otherwise, the visual weight curve value $ct_q$ is set to 3.

The thresholds $T_{q0}$-$T_{q2}$ could have any suitable values. For example, MPEG-2 supports overall quantization parameters $Q_i$, $Q_p$, and $Q_b$ for I-, P-, and B-pictures, respectively. Typical rate control in MPEG-2 shows that three constants $k_i$, $k_p$, and $k_b$ relate to the overall quantization parameters such that the same picture quality is achieved for all picture types. In effect, these constants are defined such that:

$$\frac{Q_i}{k_i} = \frac{Q_p}{k_p} = \frac{Q_b}{k_b}. \qquad (12)$$

If $k_i$ is set equal to 1, $k_p$ would equal 1.1, and $k_b$ would equal 1.8. The thresholds $T_{q0}$-$T_{q2}$ may be adapted to different picture types with the I-picture thresholds being smaller than the P-picture thresholds and the P-picture thresholds being smaller than the B-picture thresholds. A normalized set of thresholds for the I-picture may be selected, and the other threshold sets may be derived for the P- and B-pictures using the constants $k_p$ and $k_b$. Example values of the thresholds $T_{q0}$, $T_{q1}$ and $T_{q2}$ are 4, 18 and 30.

In other embodiments, the thresholds $T_{q0}$-$T_{q2}$ are based on the macroblock_type parameter instead of the picture_coding_type. An intra-coded macroblock typically requires more bits than an inter-coded macroblock to achieve the same visual quality. The result is that the quantization step size of an intra-coded macroblock may be finer than the quantization step size of an inter-coded macroblock for the same visual quality. Sets of thresholds $T_{q0}$-$T_{q2}$ may be tuned to different ranges of quantization values, with the thresholds for intra-coded macroblocks being smaller that the thresholds for inter-coded macroblocks. Example values of the thresholds $T_{q0}$, $T_{q1}$ and $T_{q2}$ are 4, 18, and 36 for intra-coded macroblocks and 8, 36, and 64 for inter-coded macroblocks.

The monotone detector 310 detects monotone or near monotone regions in an image to prevent inherent grainy details from being smoothed during filtering. In some embodiments, the monotone detector 310 compares the value of $edge_{max}$ to a threshold $T_{tex}$, which allows the monotone detector 310 to detect light texturing. If $edge_{max}$ is above $T_{tex}$, the visual weight curve value $ct_m$ is set to the visual weight curve value $ct_q$ from the quality analyzer 306. If $edge_{max}$ is below $T_{tex}$, light texturing is detected, and the visual weight curve value $ct_m$ is set to −1 (meaning zero weight or no filtering is applied to the block). An example value of the threshold $T_{tex}$ is 8.

The texture analyzer 308 handles ringing artifacts that may be present in flat regions or regions that are consistently flat when viewed temporally. These artifacts may be caused as a result of crashed motion estimation and poor intra-inter macroblock coding decisions. These artifacts are often found in fade sequences where there is an overall gradual change in luminance level and in fast motion sequences.

In some embodiments, the texture analyzer 308 selects a visual weight curve value $ct_t$ based on the value of $edge_{avg}$. Lower values of $edge_{avg}$ may indicate a higher likelihood that a block region is flat. In particular embodiments, if the value of $edge_{avg}$ is less than a first threshold $T_{m1}$, the visual weight curve value $ct_t$ is set to 4. If the value of $edge_{avg}$ is less than a second threshold $T_{m2}$, the visual weight curve value $ct_t$ is set to 3. If the value of $edge_{avg}$ is less than a third threshold $T_{m3}$ and the value of $ct_m$ is less than 2, the visual weight curve value $ct_t$ is set to 2. Otherwise, the visual weight curve value $ct_t$ is set to $ct_m$. Example values of the thresholds $T_{m0}$, $T_{m1}$ and $T_{m2}$ are 16, 24 and 32.

The visual weight curve value $ct_t$ output by the texture analyzer 308 is used by the visual weight map generator 312 to select a visual weight curve from a fixed set of visual weight curves. An example set of visual weight curves is shown in FIG. 7. For example, if the visual weight curve value $ct_t$ is 0, the visual weight map generator 312 selects curve 0 from FIG. 7. Similarly, if the visual weight curve value $ct_t$ is 4, the visual weight map generator 312 selects curve 4 from FIG. 7.

The visual weight map generator 312 uses the selected curve from FIG. 7 to generate weights to be used by the adaptive filter 314 to filter a block. For example, the visual weight map generator 312 may generate a filter weight $wgt_{x,y}$ for each pixel in the block being filtered.

In some embodiments, the y-axis of the chart in FIG. 7 represents the filter weight $wgt_{x,y}$, and the x-axis represents the relative edge magnitude within the block. The relative edge magnitude for a pixel may be calculated using the formula:

$$rel\_edge_{x,y} = edge_{x,y}/\max\{edge_{max}, T_{min}\} \qquad (13)$$

where $rel\_edge_{x,y}$ represents the relative edge magnitude for a pixel at position (x,y), and $T_{min}$ represents a threshold minimum value that $edge_{x,y}$ can be normalized with to obtain the relative edge magnitude. The threshold $T_{min}$ is used to increase the filtering weight on relatively flat blocks.

The visual weight map generator 312 calculates the relative edge magnitude for each pixel in a block being filtered. The visual weight map generator 312 then selects a pixel and, using the selected curve from FIG. 7, identifies a filter weight associated with that pixel's relative edge magnitude. For example, curve −1 (not shown in FIG. 7) may assign a filter weight of zero to a pixel no matter what the relative edge magnitude is, implying that there is no filtering. Curve 4 may assign a filter weight of one to a pixel no matter what the relative edge magnitude is, creating an averaging filtering effect having the strongest low-pass filter effect. Curves 0-3 use the relative edge magnitude of a pixel to identify a filter weight. As the curve number increases, the filter weights increase for the pixels, creating filters with lower frequencies and higher strengths.

In general, the visual weight curves shown in FIG. 7 have various characteristics. For example, the visual weight curves generally hold an inverse relationship between filter weights and relative edge magnitudes. By having an inverse relationship, ringing artifacts can be filtered at the expense of smaller edges while keeping the larger edges intact. Also, deadzones may be introduced near the maximum edge magnitude (relative edge magnitude=1) in curves 0-2 to preserve edge details better. Further, the portions of the visual weight curves nearer to a zero relative edge magnitude typically have lower gradients than the portions of the visual weight curves nearer to a unity relative edge magnitude for curves 1-3 so that flatter regions can be filtered more. In addition, a maximum weight may be generated on a zero relative edge magnitude except for curve −1.

Using the relative edge magnitudes and the maximum edge magnitude for the block, the local adaptation of the filter weights is achieved to different characteristics of the image. Also, by relating characteristics to a block statistic for a single block, block-based artifacts due to the loss of higher frequency coefficients may be resolved within the same block. By using information about edges in a selected block, the filter weights identified by the visual weight map generator 312 are based on the edge contents in the selected block.

Figure 8:
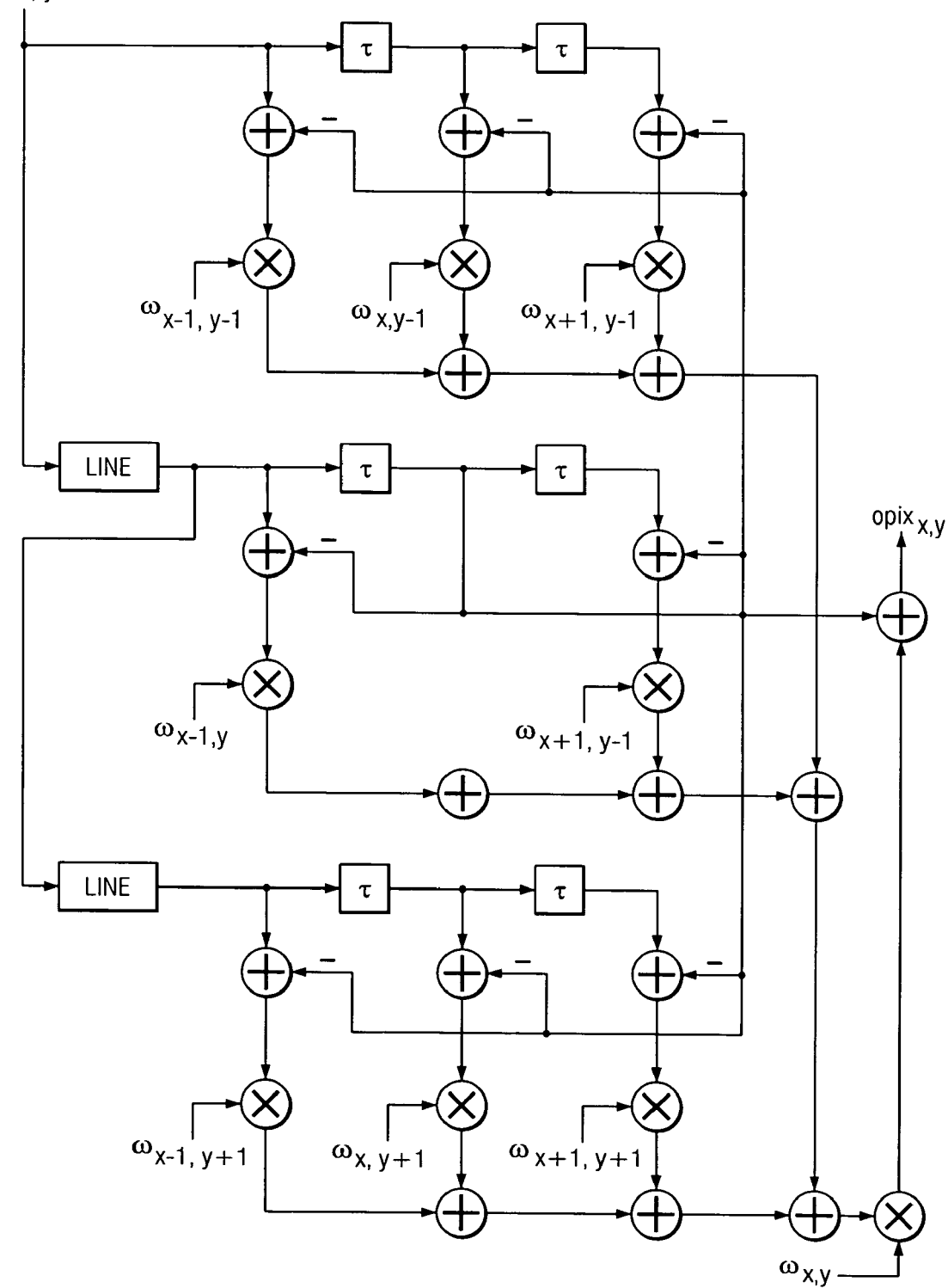
FIG. 8 illustrates a circuit diagram of a filter in an adaptive edge filter according to one embodiment of this disclosure.

In some embodiments, the adaptive filter 314 is a two-dimensional finite impulse response ("FIR") filter. In particular embodiments, the adaptive filter 314 has a 3×3 processing window, and its operation is defined using the formula:

$$opix_{x,y} = ipix_{x,y} + \frac{\omega_{x,y}}{9} \sum_{j=-1}^{1} \sum_{i=-1}^{1} \omega_{x+i,y+j}(ipix_{x+i,y+j} - ipix_{x,y}) \qquad (14)$$

where $opix_{x,y}$ represents an output pixel at position (x,y) generated by the filter 314, $ipix_{x,y}$ represents an input pixel at position (x,y) received by the filter 314, and $\omega_{x,y}$ represents the filter weight for the input pixel at position (x,y). An example embodiment of the adaptive filter 314 is shown in FIG. 8. As shown in FIG. 8, the adaptive filter 314 includes various line memories (LINE), adders, multipliers, and delay elements (τ). The adaptive filter 314 receives an input pixel and nine different weights (3×3 processing window) and generates an output pixel. The adaptive filter 314 shown in FIG. 8 is one example of circuitry that could be used to implement Equation (14), although any other hardware, software, firmware, or combination thereof could be used.

The filter weights $\omega_{x,y}$ in Equation (14) may change dynamically from pixel to pixel and are assigned corresponding to the filter weights $wgt_{x,y}$ output by the visual weight map generator 312. The output pixel value at position (x,y) represents the value of an input pixel at position (x,y), plus a delta modification of a weighted combination of the neighboring inter-pixel differences that are normalized by a central weight.

For flat regions, the adaptive filter 314 may have high coefficients in surrounding pixels, giving typical low pass characteristics. For edge regions, the adaptive filter 314 may have lower coefficients on the peak of the edge compared to the sides of the edge, giving asymmetrical characteristics with weights concentrated on a perpendicular direction to the edge.

If an input pixel lies within a flat region, a full weighted combination of surrounding inter-pixel differences may be incorporated in the output pixel. If an input pixel lies on an edge, the corresponding output pixel may equal the input pixel because the center weight ($\omega_{x,y}$) is close to zero and any inter-pixel differences would be disregarded.

If the selected visual weight curve from FIG. 7 represents curve 4, the adaptive filter 314 acts as an averaging filter, and maximum smoothing is obtained for monotone blocks. If the visual weight curve value is −1, no filtering is applied, the output pixels represent the input pixels, and the original light texture of a monotone or near monotonous block is preserved.

In effect, the adaptive edge filter 214 adapts the filter frequency and the strength variably of the filter 314 to the local edge content of images being decoded such that edges are preserved while ringing artifacts are reduced or eliminated. The adaptive filter 314 acts as a strong averaging filter applied to monotone or near monotone blocks, as a low-pass filter applied to flat regions, as a mild asymmetric low-pass filter applied to edge regions, and a range of mild to null low-pass filter applied to texture regions.

Although FIG. 3 illustrates one example of an adaptive edge filter 214 in an image decoder, various changes may be made to FIG. 3. For example, the functional division of the adaptive edge filter 214 shown in FIG. 3 is for illustration only. Various components in FIG. 3 may be combined or omitted or additional components could be added according to particular needs. Also, FIGS. 4-8 illustrate various aspects of the operation of the adaptive edge filter 214. The adaptive edge filter 214 could operate in any other suitable manner.

FIG. 9 illustrates an example method 900 for edge adaptive filtering according to one embodiment of this disclosure. For ease of explanation, the method 900 is described as being performed by the image decoder 102 of FIG. 2 operating in the system 100 of FIG. 1. The method 900 could be used by any other device and in any other system.

The image decoder 102 receives a macroblock containing image data at step 902. This may include, for example, the decoder 204 receiving a bitstream 202 containing the image data. The macroblock could originate from a DVD/VCD player 106, a video encoder 108 communicating over a network 110, or some other image source 112. This may also include the decoder 204 decoding the image data, such as by performing MPEG or JPEG decoding.

The image decoder 102 identifies encoding parameters of the macroblock at step 904. This may include, for example, the extraction unit 206 in the decoder 204 identifying encoding parameters used to encode the macroblock. As a particular example, this may include the extraction unit 206 identifying the quan_scale_code, quan_scale_type, non_linear_quan_scale, quan_matrix, macroblock_type, picture_coding_ type, and dct_type parameters.

The image decoder 102 determines if the image data in the macroblock represents interlace images at step 906. This may include, for example, the interlace decoder 208 receiving decoded image data from the decoder 204. This may also include the interlace decoder 208 analyzing the image data to determine if the image data represents interlaced images. As a particular example, this may include the interlace decoder 208 using Equations (1)-(3) and the technique shown in FIG. 4 to determine whether image data should be treated a frame coded (progressive) or field coded (interlace). This may also include the image decoder 102 using the dct_type parameter to determine if the image data represents interlaced images. In some embodiments, the image decoder 102 uses only the output of the interlace detector 208 or only the dct_type parameter to determine if the images are interlaced. In other embodiments, the image decoder 102 uses both the output of the interlace detector 208 and the dct_type parameter to determine if the images are interlaced. As an example, the image decoder 102 could assume that the images are interlaced unless the interlace detector 208 and the dct_type parameter indicate that the images are not interlaced. Moreover, if the image decoder 102 determines that an image sequence is progressive (such as when a stream of progressive images are received from DVD/VCD player 106), the image decoder 102 could skip step 906 for the remaining images.

The image decoder 102 selects a block in the received macroblock at step 908. This may include, for example, the block selector 302 dividing the macroblock into chrominance $C_r$, chrominance $C_b$, and luminance Y blocks as shown in FIG. 5. This may also include the block selector 302 using the interlace flag from the interlace detector 208 to divide the macroblock. This may further include the block selector 302 selecting one of the blocks from the macroblock.

The image decoder 102 identifies an individual pixel edge strength for each pixel in the selected block, a maximum edge strength for the selected block, and an average edge strength for the selected block at step 910. This may include, for example, the edge analyzer 304 using Equations (4)-(6) to determine the individual pixel edge strengths. This may also include the edge analyzer 304 using Equations (7)-(8) to identify the average and maximum edge strengths for the selected block.

The image decoder 102 identifies a visual weight curve value at step 912. This may include, for example, the quality analyzer 306 using the identified encoding parameters to identify the quality of the macroblock, such as by determining a value for quan_norm using Equations (9)-(11). This may also include the quality analyzer 306 comparing the value of quan_norm to various thresholds $T_{q0}$-$T_{q2}$ to identify an initial value $ct_q$ of the visual weight curve value. Further, this may include the monotone detector 310 comparing the maximum edge strength to a threshold $T_{tex}$ and identifying an intermediate value $ct_m$ that equals either the initial value $ct_q$ or a value of −1. In addition, this may include the texture analyzer 308 comparing the average edge strength to various thresholds $T_{m1}$-$T_{m3}$ to determine a final value $ct_t$ for the visual weight curve value.

The image decoder 102 selects a visual weight curve from a set of curves at step 914. This may include, for example, the visual weight map generator 312 selecting a curve from FIG. 7 using the final value $ct_t$ of the visual weight curve value.

The image decoder 102 determines a filter weight for each pixel in the selected block using the selected visual weight curve at step 916. This may include, for example, the visual weight map generator 312 calculating a relative edge magnitude for each pixel using Equation (13). This may also include the visual weight map generator 312 using the selected curve from FIG. 7 to identify a filter weight for each pixel using the calculated relative edge magnitude for each pixel. In this way, the filter weights identified by the visual weight map generator 312 are based on the edge contents in the selected image block.

The image decoder 102 filters the selected block using the filter weights at step 918. This may include, for example, the visual weight map generator 312 providing the filter weights to the adaptive filter 314. This may also include the adaptive filter 314 using Equation (14) to filter the selected block of image data.

The image decoder 102 determines if there are more blocks from the macroblock to be processed at step 920. If so, the image decoder 102 returns to step 908 to select and process another block. Otherwise, the method 900 ends. At this point, if the bitstream 202 is still being received, the image decoder 102 could receive another macroblock and repeat method 900.

Although FIG. 9 illustrates one example of a method 900 for edge adaptive filtering, various changes may be made to FIG. 9. For example, although FIG. 9 is illustrated as a series of sequential steps, various steps in the method 900 may be performed in parallel.

It may be advantageous to set forth definitions of certain words and phrases used in this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving image information representing at least one image, the image information defining multiple pixels in the at least one image;
   identifying filter weights associated with the pixels, the filter weights based on edge contents of at least a portion of the at least one image, wherein the identifying filter weights is preformed using at least one processor; and
   filtering the image information using the identified filter weights;
   determining whether the at least one image is interlaced, wherein the image information comprises a macroblock, and wherein the processor divides the macroblock into a first set of blocks if the at least one image is interlaced and divides the macroblock into a second set of blocks if the at least one image is not interlaced;
   outputting the filtered image information.

2. The method of claim 1, wherein determining whether the at least one image is interlaced comprises at least one of:
   determining whether the at least one image is interlaced using one or more encoding parameters; and
   determining whether the at least one image is interlaced by:
   determining a field correlation value using formulas of:

$$\text{field\_mean} = m_{n \atop n \in [0,1]} = \sum_{j=0}^{7} \sum_{i=0}^{15} ipix_{i,2j+n}, \text{ and}$$

$$\text{field\_correlation} = \frac{1}{128}\left(\sum_{j=0}^{7}\sum_{i=0}^{15} ipix_{i,j} ipix_{i,j+1} - \frac{m_0 m_1}{128}\right);$$

determining a field mean difference value using a formula of:

field_mean_difference=$|m_0-m_1|$;

comparing the field correlation value to a first threshold and the field mean difference value to a second threshold; and
   determining whether the at least one image is interlaced based on the comparisons;
   wherein $ipix_{i,j}$ represents the pixel at position (i,j), $m_0$ represents an even field mean, and $m_1$ represents an odd field mean.

3. The method of claim 1, wherein identifying the filter weights comprises:
   identifying an edge strength for each pixel in one of the blocks;
   identifying a maximum edge strength for the block;
   identifying an average edge strength for the block; and
   identifying a relative edge magnitude for each pixel in the block.

4. The method of claim 3, wherein:
   identifying the edge strength for each pixel comprises identifying the edge strength for each pixel using formulas of:

$$G_x = \sum_j m_{jx} \times P_j, \; G_y = \sum_j m_{jy} \times P_j, \text{ and } edge_{x,y} = |G_x| + |G_y|; \text{ and}$$

identifying the relative edge magnitude for each pixel comprises identifying the relative edge magnitude for each pixel using a formula of:

rel_edge$_{x,y}$=edge$_{x,y}$/max{edge$_{max}$,T$_{min}$};

wherein $G_x$ represents a horizontal gradient at one of the pixels, $G_y$ represents a vertical gradient at one of the pixels, $m_{jx}$ represents a horizontal mask centered at one of the pixels, $m_{jy}$ represents a vertical mask centered at one of the pixels, $P_j$ represents a value of one of the pixels, edge$_{x,y}$ represents the edge strength for the pixel at position (x,y), rel_edge$_{x,y}$ represents the relative edge magnitude for the pixel at position (x,y), edge$_{max}$ represents the maximum edge strength, and $T_{min}$ represents a threshold minimum value.

5. The method of claim 3, wherein identifying the filter weights further comprises:
   identifying one or more encoding parameters used to encode the image information; and
   identifying a visual weight curve using the one or more encoding parameters, the visual weight curve associating filter weights to relative edge magnitudes.

6. The method of claim 5, wherein identifying the visual weight curve comprises selecting a visual weight curve from a set of visual weight curves.

7. The method of claim 6, wherein selecting the visual weight curve from the set of visual weight curves comprises:
   generating a visual weight curve value by:
      setting an initial visual weight curve value based on a normalized quantization step size;
      setting an intermediate visual weight curve value based on a maximum edge strength; and
      setting a final visual weight curve value based on an average edge strength; and
   selecting the visual weight curve in the set of visual weight curves associated with the final visual weight curve value.

8. The method of claim 5, wherein:
   the visual weight curve defines an inverse relationship between relative edge magnitudes and filter weights; and a gradient of the visual weight curve at lower relative edge magnitudes is smaller than a gradient of the visual weight curve at higher relative edge magnitudes.

9. The method of claim 1, wherein filtering the image information comprises filtering the image information using a formula of:

$$opix_{x,y} = ipix_{x,y} + \frac{\omega_{x,y}}{9} \sum_{j=-1}^{1} \sum_{i=-1}^{1} \omega_{x+i,y+j}(ipix_{x+i,y+j} - ipix_{x,y}),$$

wherein $opix_{x,y}$ represents a filtered pixel at position (x,y), $ipix_{x,y}$ represents the pixel at position (x,y), and $\omega_{x,y}$ represents the filter weight associated with the pixel at position (x,y).

10. An image decoder comprising:
a decoder capable of receiving encoded image information representing at least one image and decoding the encoded image information to produce decoded image information, the decoded image information defining multiple pixels in the at least one image;
an adaptive edge filter capable of filtering the decoded image information using filter weights associated with the pixels, the filter weights based on edge contents of at least a portion of the at least one image, wherein the image information comprises a macroblock and the adaptive edge filter comprises a block selector capable of dividing the macroblock into a set of blocks, and wherein the image decoder further comprises an interlace detector capable of determining whether the at least one image is interlaced; and wherein the block selector is capable of dividing the macroblock into a first set of blocks if the at least one image is interlaced and dividing the macroblock into a second set of blocks if the at least one image is not interlaced.

11. The image decoder of claim 10, wherein the interlace detector is capable of determining whether the at least one image is interlaced by:
determining a field correlation value using formulas of:

$$\text{field\_mean} = m_{\substack{n \\ n \in \{0,1\}}} = \sum_{j=0}^{7} \sum_{i=0}^{15} ipix_{i,2j+n}, \text{ and}$$

$$\text{field\_correlation} = \frac{1}{128}\left(\sum_{j=0}^{7}\sum_{i=0}^{15} ipix_{i,j} ipix_{i,j+1} - \frac{m_0 m_1}{128}\right);$$

determining a field mean difference value using a formula of:

field_mean_difference=$|m_0-m_1|$;

comparing the field correlation value to a first threshold and the field mean difference value to a second threshold; and
determining whether the at least one image is interlaced based on the comparisons;
wherein $ipix_{x,y}$ represents the pixel at position (i,j), $m_0$ represents an even field mean, and $m_1$ represents an odd field mean.

12. The image decoder of claim 10, wherein the adaptive edge filter further comprises an edge analyzer capable of:
identifying an edge strength for each pixel in a selected one of the blocks;

identifying a maximum edge strength for the selected block; and
identifying an average edge strength for the selected block.

13. The image decoder of claim 12, wherein the edge analyzer is capable of identifying the edge strength for each pixel using formulas of:

$$G_x = \sum_j m_{jx} \times P_j,$$

$$G_y = \sum_j m_{jy} \times P_j, \text{ and}$$

$$edge_{x,y} = |G_x| + |G_y|,$$

wherein $G_x$ represents a horizontal gradient at one of the pixels, $G_y$ represents a vertical gradient at one of the pixels, $m_{jx}$ represents a horizontal mask centered at one of the pixels, $m_{jy}$ represents a vertical mask centered at one of the pixels, $P_j$ represents a value of one of the pixels, and $edge_{x,y}$ represents the edge strength for the pixel at position (x,y).

14. The image decoder of claim 12, wherein the image decoder further comprises a weight generator capable of:
identifying a relative edge magnitude for each pixel in the selected block; and
identifying a visual weight curve associating filter weights to relative edge magnitudes.

15. The image decoder of claim 14, wherein the weight generator is capable of identifying the relative edge magnitude for each pixel using a formula of:

rel_edge$_{x,y}$=edge$_{x,y}$/max{edge$_{max}$,T$_{min}$};

wherein $edge_{x,y}$ represents the edge strength for the pixel at position (x,y), rel_edge$_{x,y}$ represents the relative edge magnitude for the pixel at position (x,y), $edge_{max}$ represents the maximum edge strength, and $T_{min}$ represents a threshold minimum value.

16. The image decoder of claim 14, wherein:
the image decoder further comprises an extraction unit capable of identifying one or more encoding parameters used to encode the image information; and
the weight generator is capable of identifying the visual weight curve using the one or more encoding parameters.

17. The image decoder of claim 16, wherein the weight generator is capable of identifying the visual weight curve by selecting a visual weight curve from a set of visual weight curves.

18. The image decoder of claim 17, wherein:
the adaptive edge filter further comprises:
a quality analyzer capable of setting an initial visual weight curve value based on a normalized quantization step size;
a monotone detector capable of setting an intermediate visual weight curve value based on a maximum edge strength; and
a texture analyzer capable of setting a final visual weight curve value based on an average edge strength; and
the weight generator is capable of selecting the visual weight curve from the set of visual weight curves using the final visual weight curve value.

19. An adaptive edge filter, comprising:
a block selector capable of receiving a macroblock that defines pixels of an image, dividing the macroblock into multiple blocks, and selecting one of the blocks;

an edge analyzer capable of generating multiple edge strengths based on edge contents of the selected block;

a weight generator capable of identifying filter weights for the pixels in the selected block, the filter weights based on the edge strengths associated with the selected block; and a filter capable of filtering the selected block using the filter weights associated with the pixels in the selected block wherein the block selector is capable of dividing the macroblock into a first set of blocks if the image is interlaced and dividing the macroblock into a second set of blocks if the image is not interlaced.

20. The adaptive edge filter of claim 19, wherein the edge analyzer is capable of:

identifying an individual edge strength for each pixel in the selected block;

identifying a maximum edge strength for the selected block; and identifying an average edge strength for the selected block.

21. The adaptive edge filter of claim 20, wherein the edge analyzer is capable of identifying the individual edge strength for each pixel using formulas of:

$$G_x = \sum_j m_{jx} \times P_j,$$

$$G_y = \sum_j m_{jy} \times P_j, \text{ and}$$

$$edge_{x,y} = |G_x| + |G_y|,$$

wherein $G_x$ represents a horizontal gradient at one of the pixels, $G_y$ represents a vertical gradient at one of the pixels, $m_{jx}$ represents a horizontal mask centered at one of the pixels, $m_{jy}$ represents a vertical mask centered at one of the pixels, $P_j$ represents a value of one of the pixels, and $edge_{x,y}$ represents the individual edge strength for the pixel at position (x,y).

22. The adaptive edge filter of claim 20, wherein the weight generator is capable of:

identifying a relative edge magnitude for each pixel in the selected block using the edge strengths; and identifying a visual weight curve associating filter weights to relative edge magnitudes.

23. The adaptive edge filter of claim 22, wherein the weight generator is capable of identifying the visual weight curve using one or more encoding parameters used to encode the image.

24. The adaptive edge filter of claim 23, wherein the weight generator is capable of identifying the visual weight curve by selecting a visual weight curve from a set of visual weight curves.

25. The adaptive edge filter of claim 24, wherein:

the adaptive edge filter further comprises:

a quality analyzer capable of setting an initial visual weight curve value based on a normalized quantization step size;

a monotone detector capable of setting an intermediate visual weight curve value based on a maximum edge strength; and a texture analyzer capable of setting a final visual weight curve value based on an average edge strength; and the weight generator is capable of selecting the visual weight curve from the set of visual weight curves using the final visual weight curve value.

26. An apparatus, comprising:

an interface capable of receiving encoded image information representing at least one image; and an image decoder capable of:

decoding the encoded image information to produce decoded image information, the decoded image information defining multiple pixels in the at least one image; and filtering the decoded image information using filter weights associated with the pixels, the filter weights based on edge contents of at least a portion of the at least one image, wherein the image decoder further comprises an interlace detector capable of determining whether the at least one image is interlaced; and wherein the block selector is capable of dividing the at least one image into a first set of blocks if the at least one image is interlaced and dividing the at least one image into a second set of blocks if the at least one image is not interlaced.

27. The apparatus of claim 26, wherein the interface comprises a tuner capable of receiving television signals containing the encoded image information.

* * * * *

UNITED STATES PATENT AND TRADEMARK OFFICE
CERTIFICATE OF CORRECTION

PATENT NO. : 7,620,261 B2
APPLICATION NO. : 10/995937
DATED : November 17, 2009
INVENTOR(S) : Chiang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1371 days.

Signed and Sealed this

Fourteenth Day of December, 2010

David J. Kappos
*Director of the United States Patent and Trademark Office*